United States Patent [19]

Mamourian et al.

[11] 4,315,899
[45] Feb. 16, 1982

[54] PROCESS FOR THE PURIFICATION OF WET PHOSPHORIC ACID

[75] Inventors: Armand Mamourian, Ales; Francois Bousquet, Paris, both of France

[73] Assignee: Rhone-Poulenc Industries, Paris, France

[21] Appl. No.: 66,222

[22] Filed: Aug. 13, 1979

Related U.S. Application Data

[63] Continuation of Ser. No. 908,819, May 23, 1978, abandoned.

[30] Foreign Application Priority Data

May 23, 1977 [FR] France .............................. 77 15623

[51] Int. Cl.³ .............................................. C01B 25/16
[52] U.S. Cl. ............................ 423/321 R; 423/321 S; 423/341; 423/483
[58] Field of Search ................ 423/321 S, 321 R, 483, 423/341

[56] References Cited

U.S. PATENT DOCUMENTS

| | | | |
|---|---|---|---|
| 3,607,029 | 9/1971 | Goret et al. | 423/321 S |
| 4,083,937 | 4/1978 | Toshinitsu et al. | 423/321 S |

FOREIGN PATENT DOCUMENTS

600810  6/1960  Canada ............................ 423/321 R

*Primary Examiner*—O. R. Vertiz
*Assistant Examiner*—Gregory A. Heller
*Attorney, Agent, or Firm*—Burns, Doane, Swecker & Mathis

[57] ABSTRACT

Raw wet phosphoric acid which has been extracted from the solvent and regenerated with water according to the process of U.S. Pat. No. 3,607,029 is subsequently subjected to treatment with steam or a hot gas to afford concentrated phosphoric acid with a $F/P_2O_5$ ratio of less than 10 ppm. The acid obtained is suitable for use in the food industry.

10 Claims, No Drawings

PROCESS FOR THE PURIFICATION OF WET PHOSPHORIC ACID

This is a continuation, of application Ser. No. 908,819, filed May 23, 1978 now abandoned.

BACKGROUND OF THE INVENTION

1. Field of the Invention

The present invention concerns a process for the purification of wet phosphoric acid and, more specifically, it concerns a process for removing fluorine from same, thus affording a phosphoric acid of food quality.

2. Discussion of the Prior Art

It is known that the attack of an acid on natural phosphate rock yields after filtration a raw phosphoric liquor which contains numerous anionic and cationic impurities, including metallic ions such as the ions of Al and Fe, as well as anions such as those of the attacking acid, fluoride, silicofluoride originating in the impurities of the rock, etc. This impure phosphoric acid is unsuitable for certain applications and for this reason various purification processes have been proposed. In particular, the presence of fluorine in any form—namely, in the form of a fluoride ion, a fluosilicic ion or a metal-fluorine complex—prevents its use in the food industry, where it is specifically required that phosphoric acid must have a fluorine percentage relative to the percentage of $P_2O_5$ in the aqueous solution, below 10 parts per million (ppm).

Various processes for the elimination of fluorine have been proposed, consisting particularly of precipitating the fluorine from the raw phosphoric liquor in the form of the fluosilicate of an alkali metal or an alkaline earth metal. Another type of process consists of entraining the fluorine from the raw acid with water vapor (steam) or a hot gas, in the form of a volatile species (HF or $SiF_4$). These processes yield at best a phosphoric acid with a $F/P_2O_5$ content of 500 ppm, which again renders it unsuitable for use in the food industry.

In U.S. Pat. No. 3,607,029, issued Sept. 21, 1971, there is described a process for the purification of a raw aqueous acid resulting from a wet process comprising, in its most general aspect, the extraction of the raw acid by means of an alkyl phosphate in the presence of a strong acid, followed by the regeneration of the phosphoric acid with the aid of water, to obtain as the result, an aqueous solution of phosphoric acid substantially free of cationic impurities, but still containing a $F/P_2O_5$ content of up to 7000 ppm, which again renders the acid unfit for use in the food industry. The subject matter of U.S. Pat. No. 3,607,029 is hereby incorporated by reference into the present specification and relied upon.

BRIEF SUMMARY OF THE INVENTION

Raw wet phosphoric acid which has been extracted from the solvent and regenerated with water according to the process of U.S. Pat. No. 3,607,029 is subsequently subjected to treatment with steam or a hot gas to afford a concentrated phosphoric acid with a $F/P_2O_5$ ratio of less than 10 ppm.

DETAILED DESCRIPTION OF THE INVENTION

The object of the present invention is to provide an improved process for the defluorination of wet phosphoric acid. More particularly, U.S. Pat. No. 3,607,029 provides a process for the purification of phosphoric acid in which there is continuously extracted a purified and relatively concentrated phosphoric acid solution [containing a proportion higher than 95% of the phosphoric acid contained in the impure solutions resulting from the attack of sulfuric acid on natural phosphated rock], which process comprises passing an impure solution of phosphoric acid in countercurrent flow with a solvent consisting essentially of an alkyl derivative of phosphoric acid in a first extraction zone consisting of a plurality of stages and introducing a strong sulfuric acid at one or several stages of the first extraction zone whereby phosphoric acid is removed from the impure solution to form a phosphoric acid-solvent extract; passing the phosphoric acid-solvent extract in countercurrent flow with an aqueous solution of phosphoric acid in a second extraction zone to wash the extract to form a washed extract; passing the washed extract in countercurrent flow with an aqueous medium in a third extraction zone to separate aqueous phosphoric acid in the washed extract from the solvent; recycling the solvent issuing from the third extraction zone by returning said solvent to the first extraction zone, subdividing the aqueous purified phosphoric acid extract from the third extraction zone into one increment for use as the aqueous wash solution passed in countercurrent flow with the extract in the second extraction zone and another increment as product, the product thus afforded being an aqueous solution of phosphoric acid substantially free of cationic impurities and partially defluorinated. The present invention provides an improvement in the process of U.S. Pat. No. 3,607,029, said improvement comprising treating the aqueous solution of phosphoric acid thus purified and issuing from the third countercurrent extraction zone with water vapor (steam) or a hot gas, to afford as the final product a defluorinated concentrated phosphoric acid solution having a $F/P_2O_5$ ratio of less than 10 ppm.

According to the invention, the aqueous phosphoric acid solution issuing from the third countercurrent extraction zone through the product line 12 generally has a phosphoric acid concentration expressed in the form of $P_2O_5$ of between 15 and 30%, preferably between 20 and 26%, and a fluorine concentration expressed in the form of the $F/P_2O_5$ ratio of between 1000 ppm and 7000 ppm, the fluorine being present substantially in the form of hydrofluoric acid and fluosilicic acid.

In its most general aspect, the process of the invention includes the treatment of the preceding aqueous solution by means of steam or a hot gas. Depending on the fluoride species present in the solution, it is possible under these conditions to entrain the fluorine in the vapor phase in the form of hydrofluoric acid and of $SiF_4$, so that one separates it from the aqueous solution and exhausts the solution of fluorine until a $F/P_2O_5$ value of less than 10 ppm is attained. After this, the aqueous phosphoric acid solution, which in general is in the dilute state, presents a concentration of up to 55% of $P_2O_5$.

In a first variant according to the present invention, the aqueous phosphoric acid solution is treated with steam or hot gas in a single device in which said solution is concentrated and defluorinated. The treatment may consist of a discontinuous operation utilizing an evaporator of a known type into which there is introduced the acid solution that is heated to boiling, or else a stream of steam or hot gas is passed through the solution which had been preheated to a predetermined temperature. The concentration and defluorination treatment may be continuous, the flows of the aqueous solution of the acid and of the steam or hot gas being concurrent or countercurrent, the countercurrent system being preferred. The device for continuous treatment may consist of one or several stages. A preferred embodiment of the continuous countercurrent equipment comprises a multilevel column into which the aqueous solution to be concentrated and defluorinated is introduced from the top and the steam or hot gas flow from below, while the concentrated and defluorinated phosphoric acid is collected at the bottom of the column. Knowledge of the isotherms of the distribution of fluorine in the form of HF, $H_2SiF_6$ and $SiF_4$ between a phosphoric acid solution and its vapor allows the determination of the selection of the parameters of the apparatus and its operation with respect to the number of levels or stages, temperatures, pressures and flow rates for predetermined values of the final acid concentration and its depletion in fluorine. Other types of continuous apparatus with several stages include well-known gas-liquid contactors, such as packed columns, plate columns, pulverizing columns, etc.

The temperature measured in the apparatus is between 105° C. and 135° C., preferably between 120° C. and 130° C., and the pressure may be equal to or less than atmospheric pressure and is generally between 0.6 bar and 1 bar, the two parameters being interrelated.

In a second variant of the present invention, the regenerated aqueous solution of phosphoric acid which is substantially free of cations is initially concentrated in a first stage to the final concentration desired by means of steam or a hot gas; this causes a portion of the fluorine present in the solution to pass into the vapor phase depending on the conditions of the operation, but the $F/P_2O_5$ ratio obtained after this concentration does not attain the low value required of an acid of food quality. For this reason the solution obtained in this first stage is subsequently exposed to a final treatment of suitable defluorinating with the aid of steam or of hot gas.

The apparatus used for the concentration of the acid in the first stage of this second variant consists of well-known types of evaporators, continuous or discontinuous, concurrent or countercurrent. For reasons of energy conservation, countercurrent apparatus of the triple effect type is preferred. The isotherms of the distribution of water between the aqueous solution of phosphoric acid and its vapor allow the determination of operating conditions for a predetermined final concentration in $P_2O_5$ starting with a given dilute solution. In general, the operation proceeds under conditions of increasing pressures in the direction of the flow of phosphoric acid, preferably between 0.7 bar and 1.3 bar, and under temperature conditions increasing in the direction of the flow of the phosphoric acid of between 50° C. and 145° C. Under these conditions, the introduction of a dilute solution with a $P_2O_5$ concentration of approximately 20% leads to a solution with a $P_2O_5$ concentration of approximately 50%.

In the second stage of this second variant, the aqueous phosphoric acid solution concentrated to the desired amount obtained as the result of the first stage is subjected to an intensive defluorination by contact with steam or a hot gas. The equipment used in this second stage of the second variant consists of a known device for contacting gas with a liquid, functioning in a continuous or discontinuous and in a concurrent or countercurrent manner. However, a multistage countercurrent device such as a plate column is preferably used. The phosphoric acid solution entering the multistage, countercurrent device is generally preheated to its boiling temperature beginning at the pressure prevailing in the device and it is maintained at this temperature. The flow of water vapor is likewise superheated to said temperature so that no appreciable variation in the concentration of $P_2O_5$ in the solution will be produced. The knowledge of the isotherms of the distribution of fluorine between an aqueous phosphoric acid solution and its vapor phase permits the definition of the choice of parameters concerning the number of stages of the apparatus and its operating conditions so as to obtain a predetermined degree of fluorine depletion from a given initial acid. The temperature in the contactor is generally higher than or equal to 130° C. and the pressure is higher than or equal to 1 bar.

The process of the present invention permits the elimination of the fluorine present in a regenerated aqueous solution of phosphoric acid to a certain $F/P_2O_5$ weight ratio as a function of the choice of operating conditions and of the constitution of the equipment. Sepcifically, a fluorine depletion leading to a $F/P_2O_5$ ratio lower than 10 ppm is readily obtained. As the result of the instant process, a phosphoric acid capable of being utilized in the food industry and specifically in human nutrition is obtained.

The invention will appear more fully from the examples which follow. These examples are given by way of illustration only and are not to be construed as limiting the invention either in spirit or in scope as many modifications both in materials and methods will be apparent to those skilled in the art.

EXAMPLE 1

This example illustrates simultaneous concentration and defluorination of a dilute phosphoric acid solution obtained by regeneration with water according to U.S. Pat. No. 3,607,029 and containing 1500 ppm fluorine.

In this example, a decationized phosphoric acid obtained according to the example of U.S. Pat. No. 3,607,029 and containing 26% $P_2O_5$ is used. This solution is introduced at the top of a plate column having a theoretical plate number of 4 and working in countercurrent manner, the initial temperature of the acid being 110° C. At the base of the column there is introduced a flow of gas heated to 300° C. at a pressure of 1 bar, the ratio of the flow of gas to the flow of phosphoric anhydride being 40/1. At the bottom of the column a phosphoric acid solution is collected at a temperature of 135° C., said solution having a $P_2O_5$ content of 55% by weight and a $F/P_2O_5$ ratio of 10 ppm.

EXAMPLE 2

This example illustrates the second mode of the embodiment of the invention comprising preliminary concentration of the aqueous phosphoric acid solution originating from the water regeneration of the organic phase (issuing from the third series of extraction zones of U.S. Pat. No. 3,607,029) together with partial defluorination, followed by a later step of intensive defluorination, the $P_2O_5$ concentration of the acid remaining substantially constant.

In the first stage of concentration and partial defluorination of the decationized solution of phosphoric acid, a triple effect contactor operating in a countercurrent manner is used as equipment, the first exchanger being a stainless steel parallopipedic calender type having a height of 7 m, the second and third exchangers being of the tube and calender type, made of graphite and having a height of 6.1 m. A flow of phosphoric acid of 16.7 tons/hour is introduced with a concentration and percentages of fluorine and silicon contents as follows:

| $P_2O_5$ | percentage by weight | 15% |
|---|---|---|
| $F/P_2O_5$ | ratio by weight | 6150 ppm |
| $SiO_2/P_2O_5$ | ratio by weight | 2300 ppm |

Steam is introduced in a proportion of 2.6 tons per ton of $P_2O_5$ introduced. In the following table, the operating elements and results obtained are summarized:

TABLE

| | Temp. °C. | Absolute pressure mm Hg | Contents of the phosphoric acid solution | | | |
|---|---|---|---|---|---|---|
| | | | $P_2O_5\%$ Inlet | Outlet | $F/P_2O_5$ | $SiO_2$ mg/l |
| Exchanger 3 | 50 | 100 | 15 | 20.5 | 6150 | 800 |
| Exchanger 2 | 77 | 300 | 20.5 | 25 | 6050 | 1140 |
| Exchanger 1 | 130 | 760 | 25 | 50.5 | 800 | 190 |

The acid solution coming from the No. 1 exchanger of the triple effect contactor is preheated to a temperature of 164° C. and is then introduced continuously at the top of a plate column comprising five theoretical plates, while at the base of said column a flow of steam of 0.8 ton/ton of $P_2O_5$ is introduced at a temperature of 164° C., the pressure of the column being 2.5 bars. The product is withdrawn at the bottom of the column. The solution obtained contains 51% $P_2O_5$ and its $F/P_2O_5$ ratio is 7 ppm.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the purification, concentration and defluorination of a crude aqueous solution of wet-process phosphoric acid obtained via the sulfuric acidulation of phosphate rock, to obtain a food grade phosphoric acid characterized by an $F/P_2O_5$ ratio of less than 10 ppm, consisting essentially of (i) countercurrently liquid-liquid extracting such crude wet-process phosphoric acid with a liquid solvent consisting essentially of an alkyl derivative of phosphoric acid in a first extraction zone consisting of a plurality of stages, while concomitantly introducing strong sulfuric acid to an intermediate stage of said first extraction zone, whereby phosphoric acid is removed from the crude solution to form an extracted aqueous phosphoric acid solution; (ii) next countercurrently washing said solvent-extracted phosphoric acid solution with an aqueous solution of phosphoric acid in a second extraction zone to form a washed extract; (iii) next countercurrently water washing said washed extract in a third extraction zone to phase separate the aqueous phosphoric acid in said washed extract from said liquid solvent; and (iv) thence concentrating and defluorinating said phase separated phosphoric acid solution to an $F/P_2O_5$ level of less than 10 ppm by contacting same with steam or hot gas and entraining volatilized fluorine values therein.

2. The process as defined by claim 1, the phase separated phosphoric acid solution resulting from the step (ii) displaying an $F/P_2O_5$ ratio of from about 1000 to 7000 ppm.

3. The process as defined by claim 1, wherein the defluorination is effected in a single countercurrent flow multilevel column by contact with steam or hot gas at a temperature between 105° and 135° C. and a pressure up to 1 bar.

4. The process as defined by claim 1, wherein the defluorination is effected by partially defluorinating said aqueous solution of phosphoric acid in a single countercurrent flow apparatus by contact with steam or hot gas at varying temperatures between 50° and 145° C. and varying pressures between 0.7 and 1.3 bar and intensively defluorinating the resulting solution in a multistage, countercurrent flow apparatus by contact with steam or hot gas at a temperature greater than or equal to 130° C. and a pressure greater than or equal to 1 bar.

5. The process as defined by claim 1, which includes the step of recycling the solvent issuing from the third extraction zone by returning said solvent to the first extraction zone.

6. The process as defined by claim 1, which includes the step of subdividing the aqueous purified phosphoric acid extract into one increment as product and another increment as a wash, and passing the wash increment to the second extraction zone for countercurrent contact with the phosphoric acid-containing solvent extract.

7. The process as defined by claim 1, wherein the defluorination is effected in a single stage.

8. The process as defined by claim 1, wherein the defluorination is effected in a plurality of stages.

9. The process as defined by claim 7, wherein the defluorination is conducted discontinuously.

10. The process as defined by claim 1, wherein said entrained fluorine values comprise a member selected from the group consisting of hydrofluoric acid, fluosilicic acid, and mixture thereof.

* * * * *